United States Patent
Seo

(10) Patent No.: US 10,356,278 B2
(45) Date of Patent: Jul. 16, 2019

(54) READING APPARATUS WITH SHADING CORRECTION USING A WHITE REFERENCE MEMBER, READING METHOD, IMAGE FORMING APPARATUS, AND IMAGE FORMING SYSTEM

(71) Applicant: CANON KABUSHIKI KAISHA, Tokyo (JP)

(72) Inventor: Shinichi Seo, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/697,925

(22) Filed: Sep. 7, 2017

(65) Prior Publication Data
US 2018/0084150 A1 Mar. 22, 2018

(30) Foreign Application Priority Data
Sep. 16, 2016 (JP) .................. 2016-181273

(51) Int. Cl.
| | |
|---|---|
| *H04N 1/40* | (2006.01) |
| *H04N 1/407* | (2006.01) |
| *H04N 1/10* | (2006.01) |
| *H04N 1/12* | (2006.01) |

(52) U.S. Cl.
CPC ......... *H04N 1/4078* (2013.01); *H04N 1/1043* (2013.01); *H04N 1/125* (2013.01); *H04N 1/4076* (2013.01); *H04N 1/1035* (2013.01); *H04N 1/1048* (2013.01); *H04N 2201/044* (2013.01)

(58) Field of Classification Search
CPC .... H04N 1/4078; H04N 1/1043; H04N 1/125; H04N 1/4076; H04N 1/1035; H04N 1/1048; H04N 2201/044
USPC .......................................... 358/1.1, 1.15, 461
See application file for complete search history.

(56) References Cited

U.S. PATENT DOCUMENTS

2017/0253023 A1* 9/2017 Nishikawa ................. B41J 2/18
2018/0217543 A1* 8/2018 Kakigahara ............ G03G 15/20

FOREIGN PATENT DOCUMENTS

JP 2002-335380 11/2002

OTHER PUBLICATIONS

U.S. Appl. No. 15/697,944, filed Sep. 7, 2017.

* cited by examiner

*Primary Examiner* — Douglas Q Tran
(74) *Attorney, Agent, or Firm* — Venable LLP

(57) ABSTRACT

Provided is a reading apparatus capable of preventing luminance unevenness in a reading range by correcting shading data. An original reading unit of a reading apparatus configured to read an image on an original includes a row of light receiving elements aligned in a main scanning direction orthogonal to a direction in which the original is conveyed. The reading apparatus generates shading data used in shading correction, based on the result of reading a white reference board via the original reading unit.

9 Claims, 11 Drawing Sheets

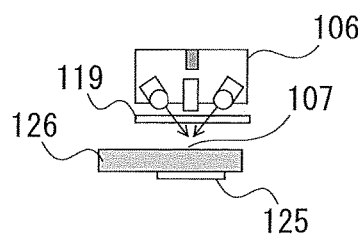
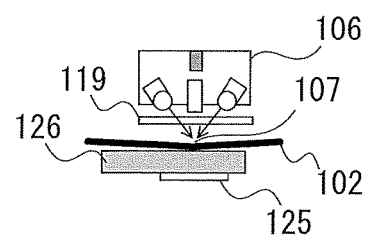
FIG. 3A    FIG. 3B
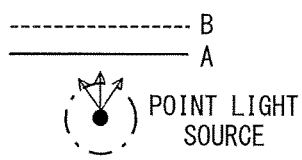
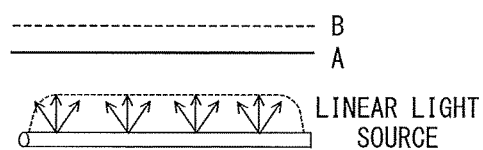
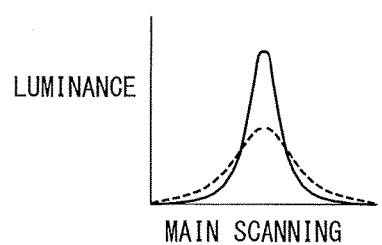
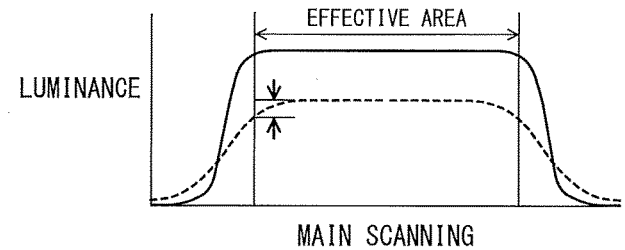
FIG. 4A    FIG. 4B

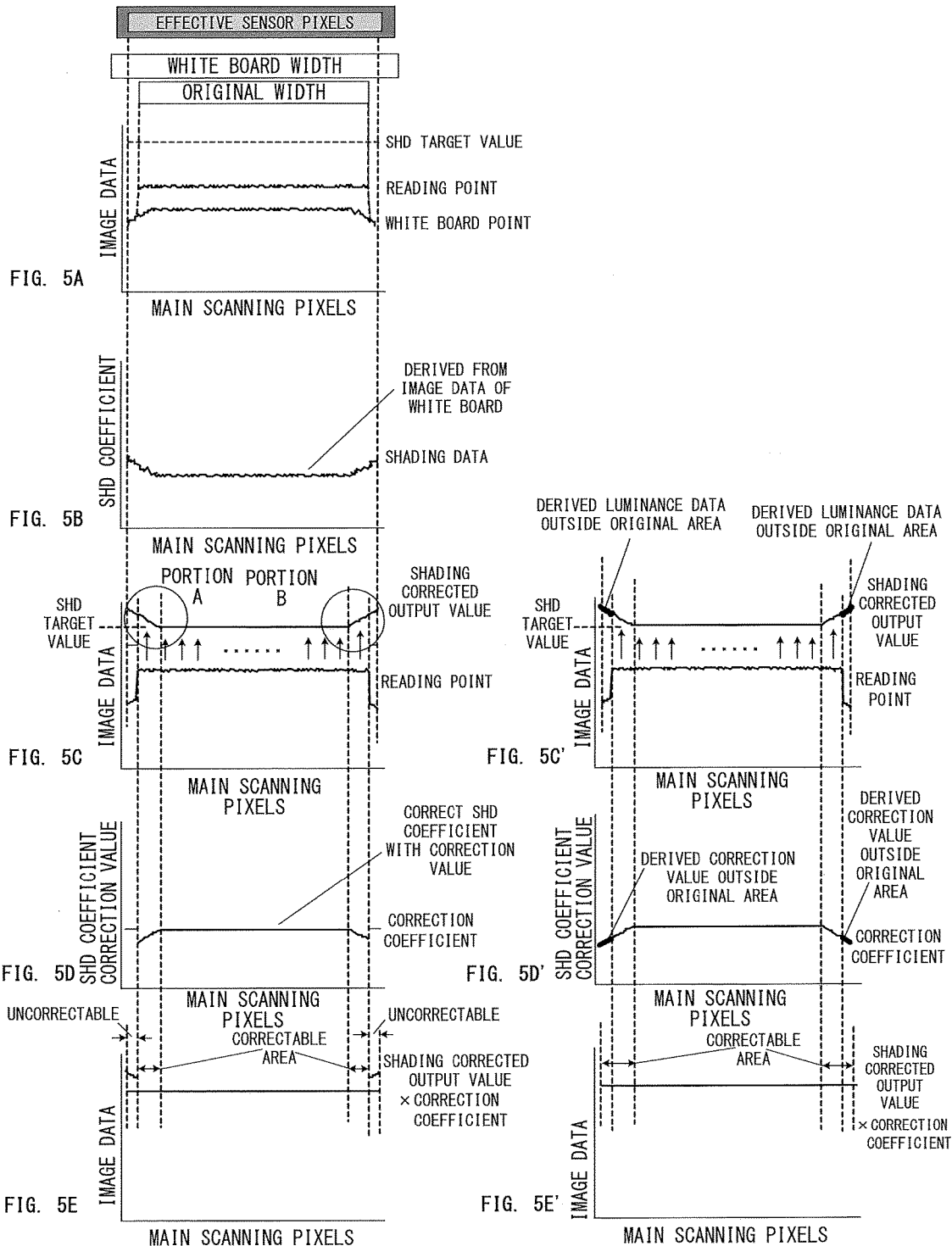

READING APPARATUS WITH SHADING CORRECTION USING A WHITE REFERENCE MEMBER, READING METHOD, IMAGE FORMING APPARATUS, AND IMAGE FORMING SYSTEM

BACKGROUND OF THE INVENTION

Field of the Invention

The present invention relates to a technology of a reading apparatus configured to read image information that is recorded on an original.

Description of the Related Art

An image reading apparatus used in copying machines, facsimile machines, and other image forming apparatus is demanded to have, among others, a high throughput in reading an original and a small risk of damaging or tearing an original that is being conveyed by avoiding making a conveyance path complicated. A reading apparatus that has been developed to meet such demands is capable of reading images on the front side and back side of an original at one time.

For instance, an image reading apparatus disclosed in Japanese Patent Application Laid-open No. 2002-335380 employs a configuration in which a front-side reading unit and a back-side reading unit are opposed to each other across a short distance in order to downsize the apparatus.

Specifically, a white reference board used to correct an optical system of the back-side reading unit is provided on a light transmissive platen on the side where the front-side reading unit is placed, in a place where the path of light used by the front-side reading unit to optically read an original is not obstructed. This keeps the white reference board from staining.

However, the white reference board of the back-side reading unit in Japanese Patent Application Laid-open No. 2002-335380 is positioned farther than a reading point. A characteristic of light read at a point far from the light source is that the distribution of the light is wide in a dark range.

An example is discussed in which shading correction is executed by reading the white reference board at a long distance from the reading point and generating shading data for shading correction.

In this case, there is luminance unevenness in which the luminance at left and right edge portions (main scanning left and right edge portions) of a reading range in a main scanning direction, which is a direction orthogonal to an original conveying direction, is lower than in a central portion of the reading range (main scanning central portion). The resultant problem is that a shading data value for the main scanning left and right edge portions is relatively higher than a shading data value for the main scanning central portion.

Another problem is in that, when an original is read while allowing the shading data value at the main scanning left and right edge portions to remain high, the luminance is higher at the main scanning left and right edge portions than in the main scanning central portion because the reading point is closer than the white reference board. The influence of the luminance at the main scanning left and right edge portions of the reading range can be eliminated by placing a light source that runs down a long stretch in the main scanning direction. A problem in this case is in that the large size of the reading unit makes the overall size of the apparatus larger.

It is therefore a main object of the present invention to provide a reading apparatus capable of preventing luminance unevenness in the reading range by correcting shading data. The present invention further provides an image forming apparatus having a function of the image reading apparatus and an image forming system having the function of the image reading apparatus.

SUMMARY OF THE INVENTION

A reading apparatus according to the present disclosure includes: a conveyor configured to convey an original; a guide member, having a one side and the opposite other side, configured to guide the original conveyed by the conveyor in a conveyance direction at the opposite other side; a reading unit configured to read the original conveyed by the conveyor; a reference member provided at the one side; an obtaining unit configured to obtain shading data, based on a result of reading the reference member by the reading unit; a shading correction unit configured to perform shading correction on a result of reading the original by the reading unit, based on the shading data and a correction coefficient; and a calculation unit configured to calculate the correction coefficient from a result of reading a reference original, which is placed on the guide member, wherein the calculation unit is configured to calculate the correction coefficient outside an area of the reference original in a main scanning direction, which is orthogonal to the conveyance direction, based on a result of reading the reference original inside the area of the reference original in the main scanning direction.

Further features of the present invention will become apparent from the following description of exemplary embodiments (with reference to the attached drawings).

BRIEF DESCRIPTION OF THE DRAWINGS

FIG. 3A and FIG. 3B are diagrams for illustrating an example of the operation of an original reading unit.

FIG. 4A and FIG. 4B are diagrams for illustrating an example of the relation between a point in a main scanning direction and a luminance, which depends on the distance from a light source (illuminance distribution characteristics).

FIG. 5A to FIG. 5E' are diagrams for illustrating the relation between the luminance of shading data that is generated as a result of reading a white reference board, a blank original, or the like and main scanning pixels that are aligned in the main scanning direction.

DESCRIPTION OF THE EMBODIMENTS

Now, an exemplary case where the present invention is applied to an image reading apparatus is described in detail. In the following, an embodiment of the present invention is described as an example of a reading apparatus in which an auto document feeder (ADF) is installed. The present invention is also applicable as an image forming apparatus that has functions of the reading apparatus.

Embodiment

Figure 1:
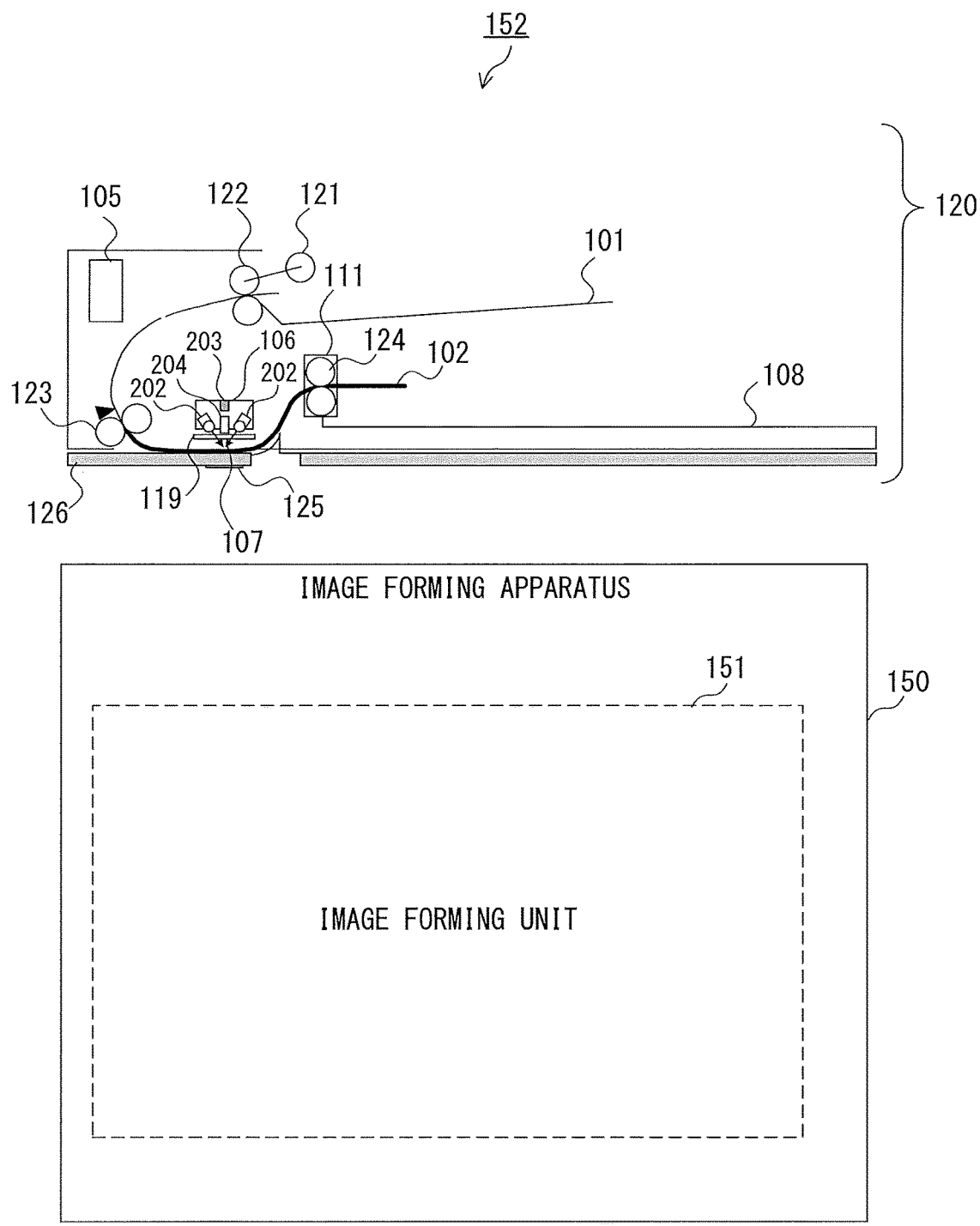
FIG. 1 is a schematic vertical sectional view for illustrating an example of the configuration of an image forming system according to an embodiment of the present invention.

FIG. 1 is a schematic vertical sectional view for illustrating an example of a configuration of an image forming system according to this embodiment.

An image forming system 152 includes a reading apparatus 120 and an image forming apparatus 150.

The image forming apparatus 150 illustrated in FIG. 1 includes an image forming unit 151 configured to form an image by a known electrophotographic printing method. The image forming unit 151 includes a photosensitive member, an exposure device, a developing device, a transfer unit, and a fixing device. The exposure device is configured to form an electrostatic latent image on the photosensitive member based on read data (image data) generated by the reading apparatus 120 reading an original 102.

In FIG. 1, how image information is read via an original reading unit 106 from the original 102 put on an original tray 101, which is described later, and fed to an original reading point 107 is illustrated. Details of the original reading operation of the reading apparatus 120 are described later.

The developing device is configured to form a developer image on the photosensitive member by developing the electrostatic latent image formed on the photosensitive member by a developer. The transfer unit is configured to transfer the developer image formed on the photosensitive member onto a given recording medium (for example, a sheet of paper). The fixing device is configured to fix the developer image transferred onto the recording medium to the recording medium. With the above-mentioned configuration, the image forming unit 151 forms an image corresponding to the image data on the recording medium.

The reading apparatus 120 of FIG. 1 includes the original tray 101, an original conveying motor 105, the original reading unit 106, a delivery tray 108, an original reading glass 119, an original picking roller 121, original separating rollers 122, and original conveying rollers 123. The reading apparatus 120 also includes original offset rollers 124, a white reference board 125, and a platen glass 126.

The original tray 101 is a tray on which one or more originals 102 to be read are put. The original conveying motor 105 is configured to drive the original picking roller 121, the original separating rollers 122, the original conveying rollers 123, and the original offset rollers 124 in order to convey the original 102.

One or more originals 102 put on the original tray 101 are fed one by one onto a conveyance path via the original picking roller 121 and the original separating rollers 120, and then conveyed on the conveyance path via the original conveying rollers 123 and the original offset rollers 124.

The original reading glass 119 is placed between the original reading unit 106 and the original reading point 107. The white reference board 125 is a reference member used to generate shading data.

The platen glass 126 is placed between the white reference board 125 and the original reading point 107, and functions as a guide member configured to guide an original that is being conveyed in a conveyance direction.

The white reference board 125 serving as a reference member is provided at one side of the platen glass 126 which serves as a guide member. The platen glass 126 has the opposite other side. The platen glass 126 guides the original that is being conveyed in a conveyance direction at the opposite other side.

The original reading unit 106 includes a light guiding member 202, a Contact Image Sensor (CIS) 203 as an example of a line sensor made up of a row of light receiving elements aligned in a main scanning direction, and a lens 204. The main scanning direction is a direction that is orthogonal to an original conveyance direction, and that aligns with the row of light receiving elements of the CIS 203.

The light guiding member 202 is used to irradiate an original surface (reading surface) of the original 102 with light from a light emitting diode (LED) light source 201, which is described later, at the original reading point 107.

The CIS 203 uses the light receiving elements to perform photoelectric conversion on light that has been reflected by the original 102 and led through the lens 204, and outputs an electric signal whose signal intensity is determined by the light intensity of the incident light.

Image information on the original 102 conveyed along the conveyance path is read by the original reading unit 106 when the original 102 passes through the original reading point 107. The original 102 that has been read by the original reading unit 106 is conveyed further to be ejected onto the delivery tray 108.

Figure 2:
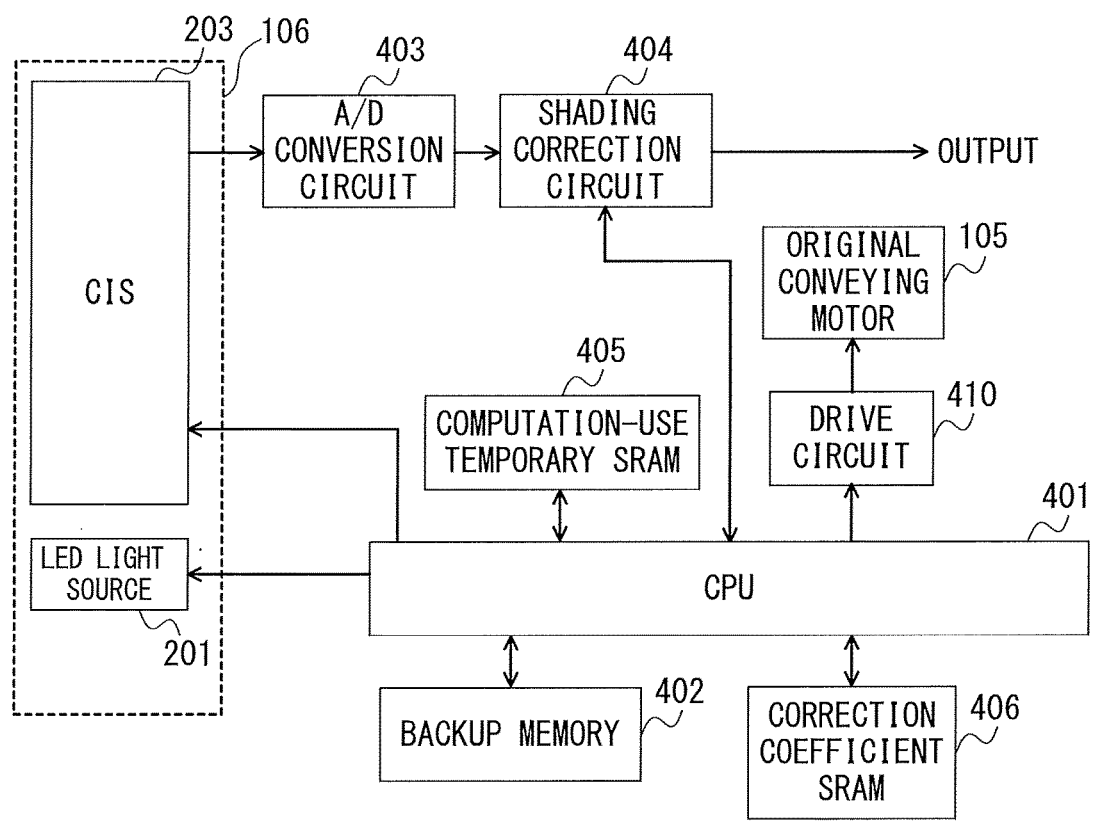
FIG. 2 is a block diagram for illustrating an example of the function configuration of a reading apparatus.

FIG. 2 is a block diagram for illustrating an example of the function configuration of the reading apparatus 120.

The reading apparatus 120 includes a central processing unit (CPU) 401, a backup memory 402, an A/D conversion circuit 403, a shading correction circuit 404, and a computation-use temporary static random access memory (SRAM) 405. The reading apparatus 120 also includes a correction coefficient SRAM 406 and a drive circuit 410.

The CPU 401 is configured to perform overall control on the operation of the reading apparatus 120. The CPU 401 is configured to control the reading of an original image by controlling the turning on/off of the LED light source 201, and by controlling the CIS 203, the original conveying motor 105, the backup memory 402, and other components.

The flow of an image signal that is generated by reading the original 102 is described. An electric signal whose signal intensity is determined by the original's density output from the CIS 203 is converted from an analog electric signal into a digital image signal via the A/D conversion circuit 403. The digital image signal obtained by the conversion and output from the A/D conversion circuit 403 is corrected via the shading correction circuit 404 with regard to the influence of unevenness in the light intensity of the LED light source 201 and the influence of sensitivity fluctuations among pixels of the CIS 203. The shading correction circuit 404 outputs a corrected image signal.

Returning to the description of FIG. 2, the backup memory 402 is a non-volatile random access memory (RAM) used to store a reading value that is obtained by reading the white reference board 125 for shading correction (hereinafter referred to as "shading data"). The backup memory 402 is configured so as to be capable of transmitting and receiving data to and from the shading correction circuit 404 via the CPU 401.

The computation-use temporary SRAM 405 is configured to temporarily store various types of data that are output from the backup memory 402 and the shading correction circuit 404 via the CPU 401.

The correction coefficient SRAM 406 is configured to store a correction coefficient, which is calculated from a luminance value in a pixel in a central portion of a reading range in the main scanning direction (main scanning central portion) and the luminance value of pixels at left and right edge portions of the reading range (main scanning left and right edge portions).

The correction coefficient is used to correct shading data that is obtained by reading the white reference board 125 for shading correction. The shading data that has been corrected using the correction coefficient is referred to as "corrected shading data", and details of the correction coefficient calculation are described later.

Next, details of the shading correction executed in the shading correction circuit 404 are described.

Shading correction is processing executed to correct the influence of unevenness in the light intensity of the LED light source 201 and the influence of sensitivity fluctuations from pixel to pixel in the CIS 203, based on a reading value that is obtained by reading the white reference board 125 (shading data). Data after shading correction (hereinafter referred to as "shading corrected output value") can be obtained by Expression (1) described below.

Shading corrected output value ($n$)=original reading value ($n$)/shading data ($n$)×reading target value     Expression (1)

The symbol n in Expression (1) represents the position of a pixel in the CIS 203. A target value for a reading value that is obtained by reading a white reference original is set as the reading target value. The shading data is data that is generated by reading the white reference original.

The obtained shading data is stored in the backup memory 402 as described above. Shading is corrected by reading shading data out of the backup memory 402 when the original 102 is read, and setting the read shading data to the shading correction circuit 404. This enables the reading apparatus 120 to read an original while correcting the influence of unevenness in the light intensity of the LED light source 201, the influence of sensitivity fluctuations from pixel to pixel in the CIS 203, or other adverse effects.

In normal original reading operation, the original 102 is read after shading correction is executed using the shading data described above. The shading data itself needs to be corrected in a testing process that is conducted in preparation for shipment out of the factory, or in the case where the original reading unit 106 is replaced in the market.

Next, with reference to FIG. 3A and FIG. 3B, description is made of the operation of the original reading unit 106 to calculate a correction coefficient used to correct the shading data itself, which is used for shading correction.

FIG. 3A and FIG. 3B are diagrams for illustrating an example of the operation of the original reading unit 106.

FIG. 3A is a diagram for illustrating a state in which the original reading unit 106 reads a surface of the white reference board 125 through the original reading glass 119 and the platen glass 126. FIG. 3B is a diagram for illustrating a state in which the original reading unit 106 reads the original 102 that has been conveyed at the original reading point 107. The distance from the light source to a point on the surface of the white reference board 125 is thus greater than the distance from the light source to the original reading point. As illustrated in FIG. 3A and FIG. 3B, the original reading unit 106 is configured to read the surface of the white reference board 125 and then read image information of the conveyed original 102.

FIG. 4A and FIG. 4B are each a diagram for illustrating an example of the relation between a point in a main scanning direction and a luminance, which depends on the distance from the light source (illuminance distribution characteristics). The light source in FIG. 4A is a point light source, which irradiates light from a single point (upper half of FIG. 4A), and illuminance distribution characteristics observed when the point light source is used are shown in a graph (lower half of FIG. 4A). The light source in FIG. 4B is a line light source, which irradiates light linearly (upper half of FIG. 4B), and illuminance distribution characteristics observed when the line light source is used are shown in a graph (lower half of FIG. 4B). In each of the graphs, the axis of ordinate represents the luminance and the axis of abscissa represents the main scanning direction.

Lines A and B in FIG. 4A and FIG. 4B each represent a luminance observation point. The line B is relatively greater in the distance from the light source than the line A, that is, observation points of the line B are farther from the light source than observation points of the line A.

When the light source used is a point light source, the point light source has illuminance distribution characteristics in which the distribution is wide in a dark range, with the luminance dropping significantly even at a little distance from the light source as illustrated in FIG. 4A.

Light irradiated via the light guiding member 202 of the original reading unit 106, on the other hand, irradiates the original surface as linear light as illustrated in FIG. 4B. The luminance in this case has an even distribution in the central portion (effective area in FIG. 4B). However, the linear light has characteristics in that the luminance at the edge portions decreases as the distance from the light source increases.

Next, a case is discussed in which an original used has a uniform density (for example, blank original) and has a narrow width relative to the width of a main scanning area (effective sensor pixels) (length in the main scanning direction) of the original reading unit 106. With the width of the blank original equal to or less than the width of the main scanning area of the original reading unit 106, correction described below is necessary. The operation of the original reading unit 106 to correct shading data is described with reference to FIG. 5A to FIG. 5E'.

This operation is executed on the occasions described above, which are a testing process conducted in preparation for shipment out of the factory, and the replacement of the original reading unit 106 in the market, and is not executed in normal reading operation.

FIG. 5A to FIG. 5E' are diagrams for illustrating the relation between the luminance of shading data that is generated as a result of reading the white reference board 125, the blank original, or the like and the main scanning pixels that are aligned in the main scanning direction. In the graphs shown in FIG. 5A to FIG. 5E', the axis of ordinate represents the luminance and the axis of abscissa represents main scanning pixels aligned in the main scanning direction.

As illustrated in FIG. 4A described above, a point light source has illuminance distribution characteristics in which the distribution is wide in a dark range at observation points of the line B, which is relatively farther from the light source than the line A is. As illustrated in FIG. 4B, a linear light source has illuminance distribution characteristics in which the luminance distribution is even in the central portion but the luminance at the edge portions decreases as the distance from the light source increases.

Consequently, luminance data that is obtained by reading the white reference board 125 (see FIG. 3A) with the original reading unit 106 is one at a white board point illustrated in FIG. 5A. The luminance data at the white board point in FIG. 5A indicates that the luminance data is low in pixels at the main scanning left and right edges.

A blank original generally has, as described above, a width equal to or less than the width of the main scanning area of the original reading unit 106, in other words, is smaller in size than the main scanning area, which is an effective sensor area of the original reading unit 106. Luminance data that is generated by reading a blank original is accordingly luminance data at a reading point illustrated in FIG. 5A.

Specifically, in other areas (outside a reference original area, hereinafter referred to as "outside the original area") than an area where the blank original is present (inside a reference original area, hereinafter referred to as "inside the original area"), the original reading unit 106 reads the white reference board 125 instead of the original 102, and data in other areas than the original is equivalent to luminance data at the white board point.

Shading data derived from a reading result as the one in FIG. 5A is shading data (SHD coefficient) illustrated in FIG. 5B. The value of the shading data at the main scanning left and right edges is relatively higher than the shading data value in the central portion in order to make luminance data at the main scanning left and right edges even with luminance data in the central portion.

In the case where the shading data of FIG. 5B is applied to luminance data that is obtained by reading a blank original, the resultant shading corrected output value is as illustrated in FIG. 5C. Inside the original area, the luminance data does not have a uniform value at the main scanning left and right edge portions as illustrated in FIG. 5C, and the luminance data value is higher in pixels at the main scanning left and right edge portions than in a pixel in the central portion.

Outside the original area, the white reference board 125 is read instead of the original 102. This means that, outside the original area, the shading data is applied to the luminance data that is obtained by reading the white reference board 125. The luminance characteristics of pixels at the main scanning edge portions cannot be detected at the original reading point 107 as a result.

In the case where luminance data outside the original area is used, luminance data of the original 102 in a pixel in the main scanning central portion is compared to luminance data of pixels in the main scanning left and right edge portions. A correction coefficient that is calculated based on a difference obtained from the comparison is as illustrated in FIG. 5D.

The shading corrected output value of FIG. 5C that is corrected with the use of the correction coefficient of FIG. 5D is accordingly not uniform luminance data outside the original area, unlike luminance data illustrated in FIG. 5E which is the product of a shading corrected output value and a correction coefficient. The non-uniform data is undesirably divided into, for example, a correctable area and an uncorrectable area as illustrated in FIG. 5E.

It is therefore necessary to obtain overall luminance characteristics of the main scanning area of the original reading unit 106 based on derived luminance data outside the original area in shading corrected output, as illustrated in FIG. 5C'. The shading data of FIG. 5B also needs to be corrected so that the luminance data has a uniform value. A method of deriving the luminance data outside the original area is described later.

For example, in order to correct the shading data, a correction coefficient in pixels at the main scanning left and right edge portions is calculated based on luminance data in a pixel in the main scanning central portion and luminance data in pixels at the main scanning left and right edge portions as illustrated in FIG. 5D'. The calculated correction coefficient is used to correct the shading corrected output value of FIG. 5C'. In this manner, non-uniform luminance data can be turned into luminance data having a uniform value as the luminance data of FIG. 5E' which is the product of a shading corrected output value and a correction coefficient.

Next, with reference to FIG. 6A and FIG. 6B, FIG. 7, and FIG. 8, a method of calculating the correction coefficient of FIG. 5D is described.

Figure 6A:
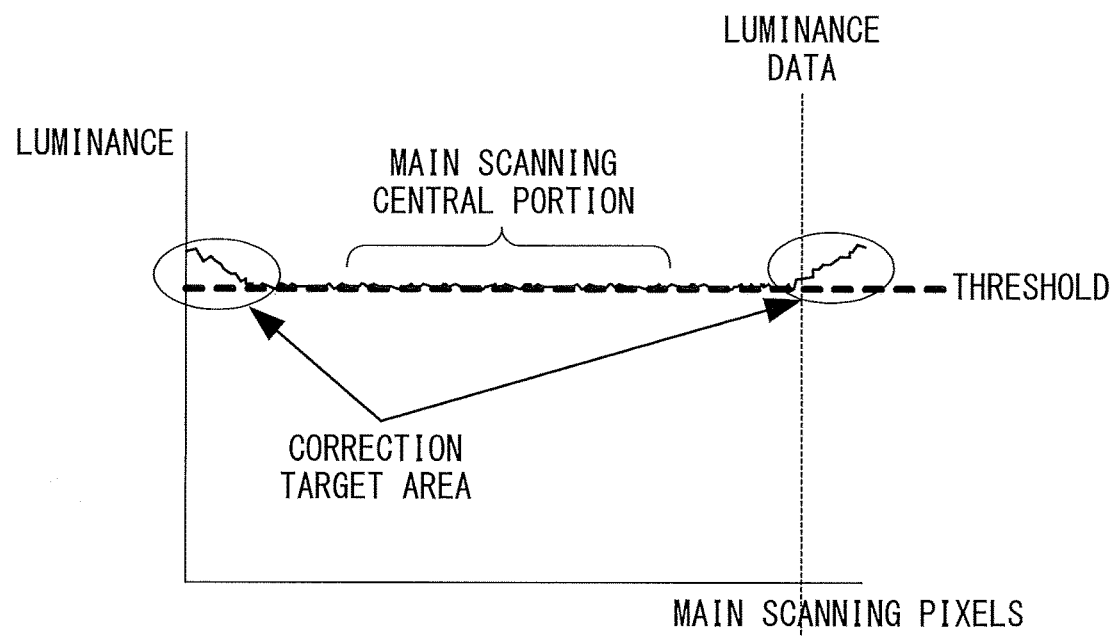
FIG. 6A and FIG. 6B are graphs for showing how a threshold is set when a correction coefficient is calculated based on the luminance in a main scanning central portion and the luminance at main scanning left and right edge portions.
Figure 6B:
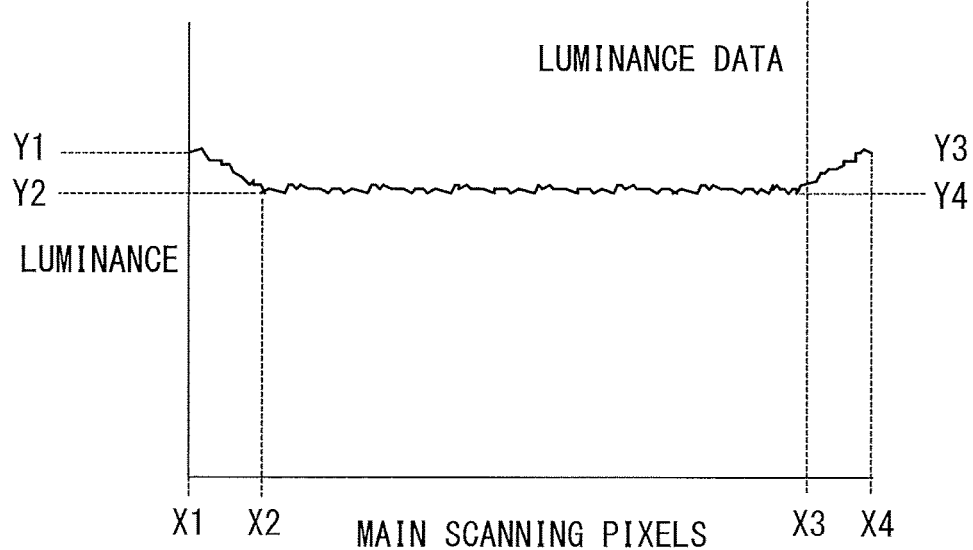

FIG. 6A and FIG. 6B are graphs for showing how a threshold is set when a correction coefficient is calculated based on the luminance in the main scanning central portion and the luminance at the main scanning left and right edge portions. In the graphs of FIG. 6A and FIG. 6B, the axis of ordinate represents the luminance and the axis of abscissa represents main scanning pixels aligned in the main scanning direction.

Figure 7:
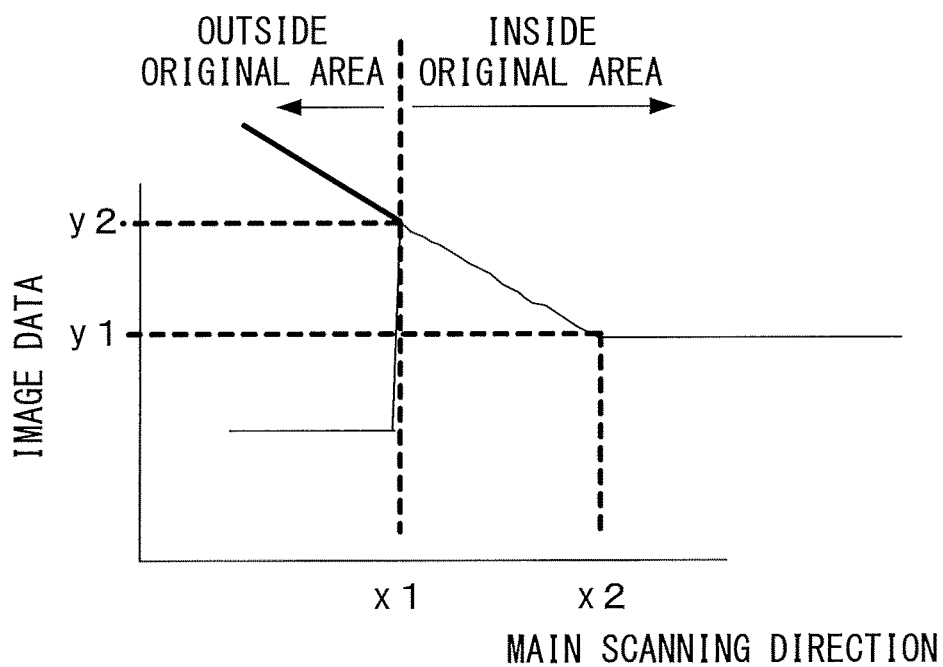
FIG. 7 is an enlarged view of a portion A of a shading corrected output value in FIG. 5C.
Figure 8:
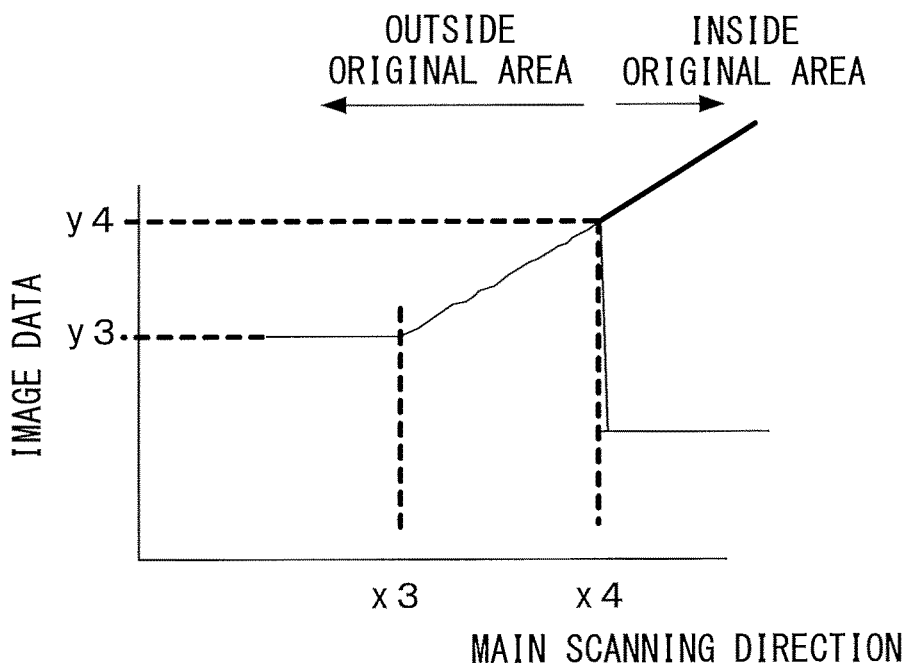
FIG. 8 is an enlarged view of a portion B of the shading corrected output value in FIG. 5C.

FIG. 7 is an enlarged view of the portion A of the shading corrected output value illustrated in FIG. 5C. Further, FIG. 8 is an enlarged view of the portion B of the shading corrected output value illustrated in FIG. 5C. In the graphs of FIG. 7 and FIG. 8, the axis of ordinate represents the luminance value of image data and the axis of abscissa represents the main scanning direction.

A luminance value that serves as a threshold is set based on luminance data in the main scanning central portion as shown in FIG. 6A. The threshold is, for example, an average of luminance values at a plurality of main scanning points in the main scanning central portion. A pixel that has a luminance value higher than the threshold is identified as a pixel to be corrected, and a correction coefficient used to correct shading data for this correction target pixel is calculated. For a pixel that does not exceed the threshold, 1 is set as a correction coefficient. The correction coefficient can be calculated by Expression (2) described below.

Correction coefficient $(x)$=threshold luminance/pixel luminance exceeding threshold $(x)$     Expression (2)

The symbol x represents a pixel that exceeds the threshold.

A correction coefficient calculated by Expression (2) is stored in the correction coefficient SRAM 406.

For example, a main scanning pixel value that is stored in the backup memory 402 after shading data is obtained and that exceeds the threshold is read, and a correction coefficient stored in the correction coefficient SRAM 406 is applied to the main scanning pixel that exceeds the threshold to correct the shading data. The main scanning luminance data of the original 102 at the original reading point 107 is uniformized in this manner (see FIG. 5E).

Corrected shading data can be derived by Expression (3) described below.

Corrected shading data (x)=shading data (x)×correction coefficient (x)   Expression (3)

A shading corrected output value (x) at a left edge portion (portion A) of a row of main scanning pixels outside the original area is derived from the rate of change in shading corrected output value (x) inside the original area (luminance value change rate). The shading corrected output (x) in the portion A outside the original area can be derived by Expression (4) described below.

Shading corrected output value (x) in portion A outside original area=y2+(y2−y1)/(x2−x1)×(x1−x)   Expression (4)

x1=a maximum change rate point inside the original area
y2=a maximum change rate value inside the original area
x2=a minimum change rate point inside the original area
y1=a minimum change rate value inside the original area A shading corrected output value (x) at a right edge portion (portion B) of a row of main scanning pixels outside the original area is derived from the rate of change in shading corrected output value (x) inside the original area (luminance value change rate). The shading corrected output (x) in the portion B outside the original area can be derived by Expression (5) described below.

Shading corrected output value (x) in portion B outside original area=y4+(y4−y3)/(x4−x3)×(x−x1)   Expression (5)

x3=a maximum change rate point inside the original area
y4=a maximum change rate value inside the original area
x4=a minimum change rate point inside the original area
y3=a minimum change rate value inside the original area Next, with reference to FIG. 9A to FIG. 9E, description is made of the operation of the original reading unit 106 to correct shading data using an original that has a uniform density (for example, blank paper) and that is wide relative to the width of the main scanning area (effective sensor pixels) of the original reading unit 106.

This operation is executed on the occasions described above, which are a testing process conducted in preparation for shipment out of the factory, and the replacement of the original reading unit 106 in the market, and is not executed in normal reading operation.

FIG. 9A to FIG. 9E are diagrams for illustrating the relation between the luminance of shading data that is generated as a result of reading the white reference board 125, a blank original, or the like and main scanning pixels that are aligned in the main scanning direction. In the graphs of FIG. 5A to FIG. 5E', the axis of ordinate represents the luminance and the axis of abscissa represents main scanning pixels aligned in the main scanning direction.

As illustrated in FIG. 4A described above, a point light source has illuminance distribution characteristics in which the distribution is wide in a dark range at observation points of the line B, which is relatively farther from the light source than the line A is. As illustrated in FIG. 4B, a linear light source has illuminance distribution characteristics in which the luminance distribution is even in the central portion but the luminance at the edge portions decreases as the distance from the light source increases.

Figure 9:
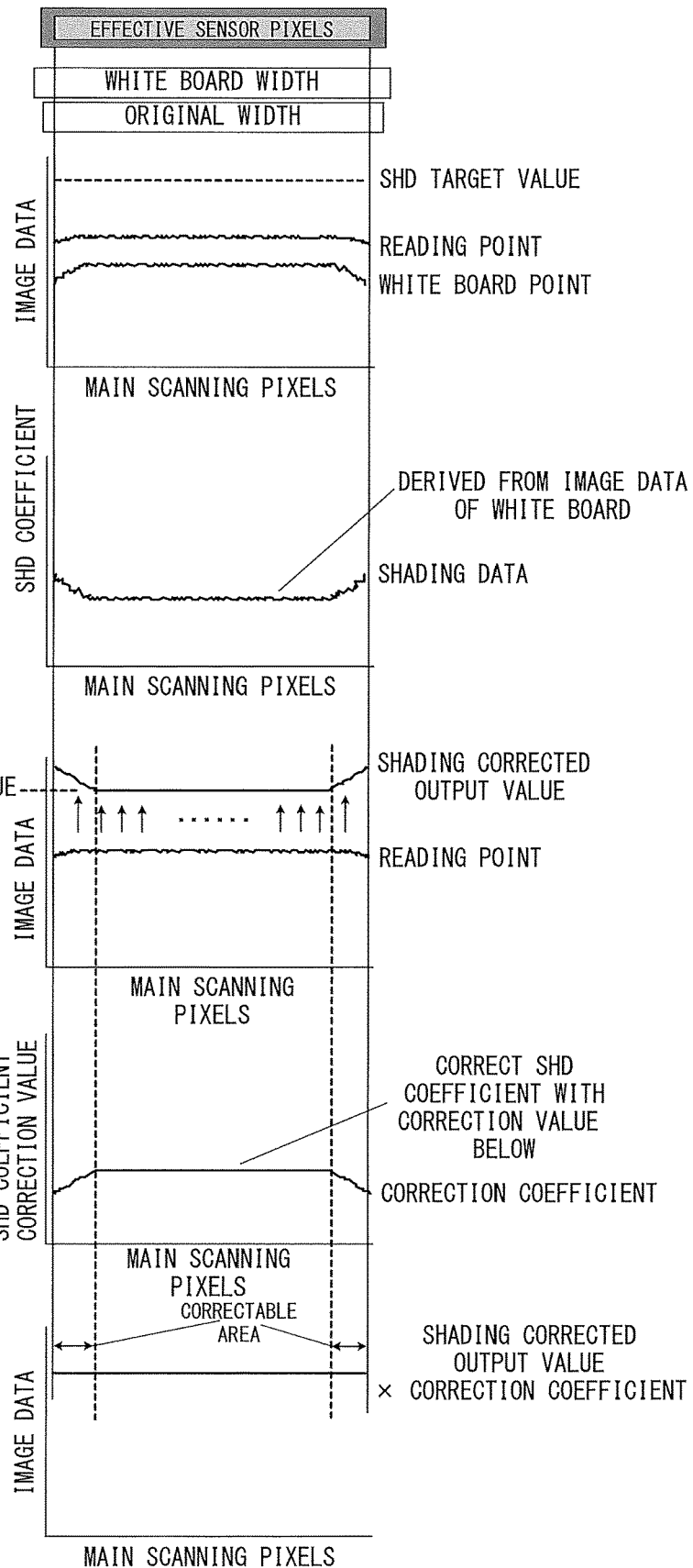
FIG. 9A to FIG. 9E are diagrams for illustrating the relationship between the luminance of shading data, which is generated as a result of reading a white reference board, a blank original, or the like, and main scanning pixels that are aligned in the main scanning direction.

Consequently, luminance data that is obtained by reading the white reference board 125 (see FIG. 3A) with the original reading unit 106 is one at a white board point illustrated in FIG. 9A. The luminance data at the white board point in FIG. 9A indicates that the luminance is low in pixels at the main scanning left and right edges.

Shading data derived from a reading result as the one in FIG. 9A is shading data (SHD coefficient) illustrated in FIG. 9B. The shading data at the main scanning left and right edges is higher than the shading data in the central portion in order to make luminance data at the main scanning left and right edges even with luminance data in the central portion.

In the case where the shading data of FIG. 9B is applied to luminance data that is obtained by reading a blank original, the resultant shading corrected output value is as illustrated in FIG. 9C. Inside the original area, the luminance data does not have a uniform value at the main scanning left and right edge portions as illustrated in FIG. 9C, and the luminance data is higher in pixels at the main scanning left and right edge portions than in a pixel in the central portion. The shading data therefore needs to be corrected so that the luminance data is uniform.

For example, in order to correct the shading data, a correction coefficient in pixels at the main scanning left and right edge portions is calculated based on luminance data in a pixel in the main scanning central portion and luminance data in pixels at the main scanning left and right edge portions as illustrated in FIG. 9D. The calculated correction coefficient is used to correct the shading corrected output value of FIG. 9C, thereby obtaining uniform luminance data as the one in FIG. 9E which is the product of a shading corrected output value and a correction coefficient.

Next, with reference to FIG. 6A and FIG. 6B described above, a method of calculating the correction coefficient of FIG. 9B is described.

A luminance value that serves as a threshold is set based on luminance data in the main scanning central portion as shown in FIG. 6A. The threshold is, for example, an average of a plurality of luminance values of the main scanning central portion. A pixel that has a luminance value higher than the threshold is identified as a pixel to be corrected, and a correction coefficient used to correct shading data for this correction target pixel is calculated. The correction coefficient can be calculated by Expression (6) described below.

Correction coefficient (x)=threshold luminance/pixel luminance exceeding threshold (x)   Expression (6)

The symbol x represents a pixel that exceeds the threshold.

A correction coefficient calculated by Expression (6) is stored in the correction coefficient SRAM 406.

When the correction coefficient is calculated for each pixel based on the luminance (x) of the pixel, the luminance (x) of every pixel to be corrected needs to be stored in the backup memory 402, which gives rise to problems including an increase in memory size. The memory size may be reduced by employing a method in which the rate of change in luminance higher than the threshold is expressed as an approximated straight line and the correction coefficient (x) is calculated based on the approximated straight line. For example, in the case of the shading corrected output value of FIG. 9C where the luminance data has a high value at main scanning left and right edges, it can be said that the luminance change rate at the main scanning left and right edges is substantially an approximated straight line.

Pixel positions and luminance values are stored in the backup memory 402, for example, a pixel position X2 and a luminance value Y2 at which the luminance starts to rise above the threshold, and a pixel position X1 and a luminance value Y1 at which the luminance is maximum on the left side of the row of main scanning pixels as shown in FIG. 6B. A pixel position X3 and a luminance value Y3 at which the luminance starts to rise above the threshold, and a pixel position X4 and a luminance value Y4 at which the luminance is maximum on the right side of the row of main scanning pixels are also stored in the backup memory 402. The eight values are stored in the backup memory 402 to be used in the calculation of the correction coefficient (x). The correction coefficient in this case can be calculated by Expression (7) described below.

Correction coefficient $(x) = Y3 + \{(Y4-Y3)/(X4-X3)\} \times (x-X3)$   Expression (7)

The symbol x represents a pixel that exceeds the threshold.

Calculating a correction coefficient from eight values in this manner reduces the amount of data stored in the backup memory 402.

For example, a main scanning pixel value that is stored in the backup memory 402 after shading data is obtained and that exceeds the threshold is read, and a correction coefficient stored in the correction coefficient SRAM 406 is applied to the main scanning pixel that exceeds the threshold to correct the shading data. The main scanning luminance data of the original 102 at the original reading point 107 is uniformized in this manner (see FIG. 9E).

Corrected shading data can be derived by Expression (8) described below.

Corrected shading data $(x) =$ shading data $(x) \times$ correction coefficient $(x)$   Expression (8)

Figure 10:
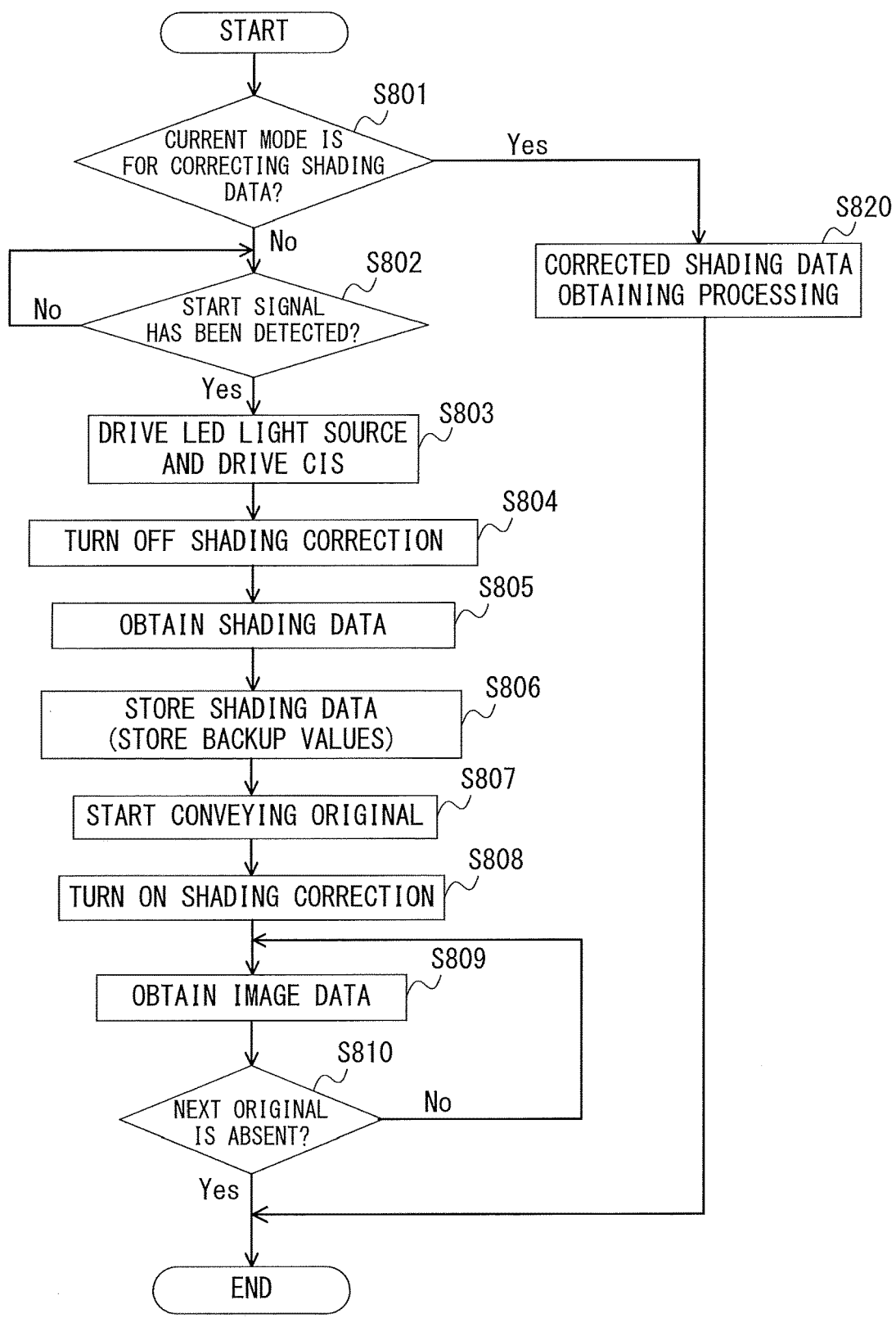
FIG. 10 is a flow chart for illustrating an example of original reading operation that is executed by the reading apparatus.

FIG. 10 is a flow chart for illustrating an example of reading operation of the original 102 that is executed by the reading apparatus 120. Processing procedures illustrated in FIG. 10 are executed mainly by the CPU 401.

The CPU 401 determines whether or not the reading apparatus 120 is in a mode for correcting shading data (Step S801). When the reading apparatus 120 is in the shading data correcting mode (Step S801: "Yes"), the CPU 401 proceeds to corrected shading data obtaining processing (processing procedures illustrated in FIG. 11 and FIG. 12), which is described later (Step S820). When the reading apparatus 120 is not in the shading data correcting mode (Step S801: "No"), the CPU 401 determines whether or not a start signal that signals the start of original reading has been detected (Step S802).

When the start signal is detected (Step S802: "Yes"), the CPU 401 starts driving the LED light source 201 and the CIS 203 (Step S803).

The CPU 401 turns off shading correction (Step S804) and, in this state, reads the white reference board 125 via the original reading unit 106 to obtain shading data (Step S805). The CPU 401 stores the obtained shading data in the backup memory 402 (Step S806).

The CPU 401 turns on shading correction (Step S807). The CPU 401 drives the original conveying motor 105 to start conveying the original 102 that is placed on the original tray 101 (Step S808).

The CPU 401 obtains image data of the original 102 via the original reading unit 106 (Step S809). In this step, the CPU 401 corrects the shading data obtained in Step S805 using Expression (3) and a correction coefficient stored in the correction coefficient SRAM 406 to obtain corrected shading data. The CPU 401 sets the corrected shading data to the shading correction circuit 404. The shading correction circuit 404 performs shading correction on image data of the original 102 using the corrected shading data.

The CPU 401 determines whether or not there is the next original (Step S810). The reading operation is repeated in this manner until no original 102 is left on the original tray 101.

Figure 11:
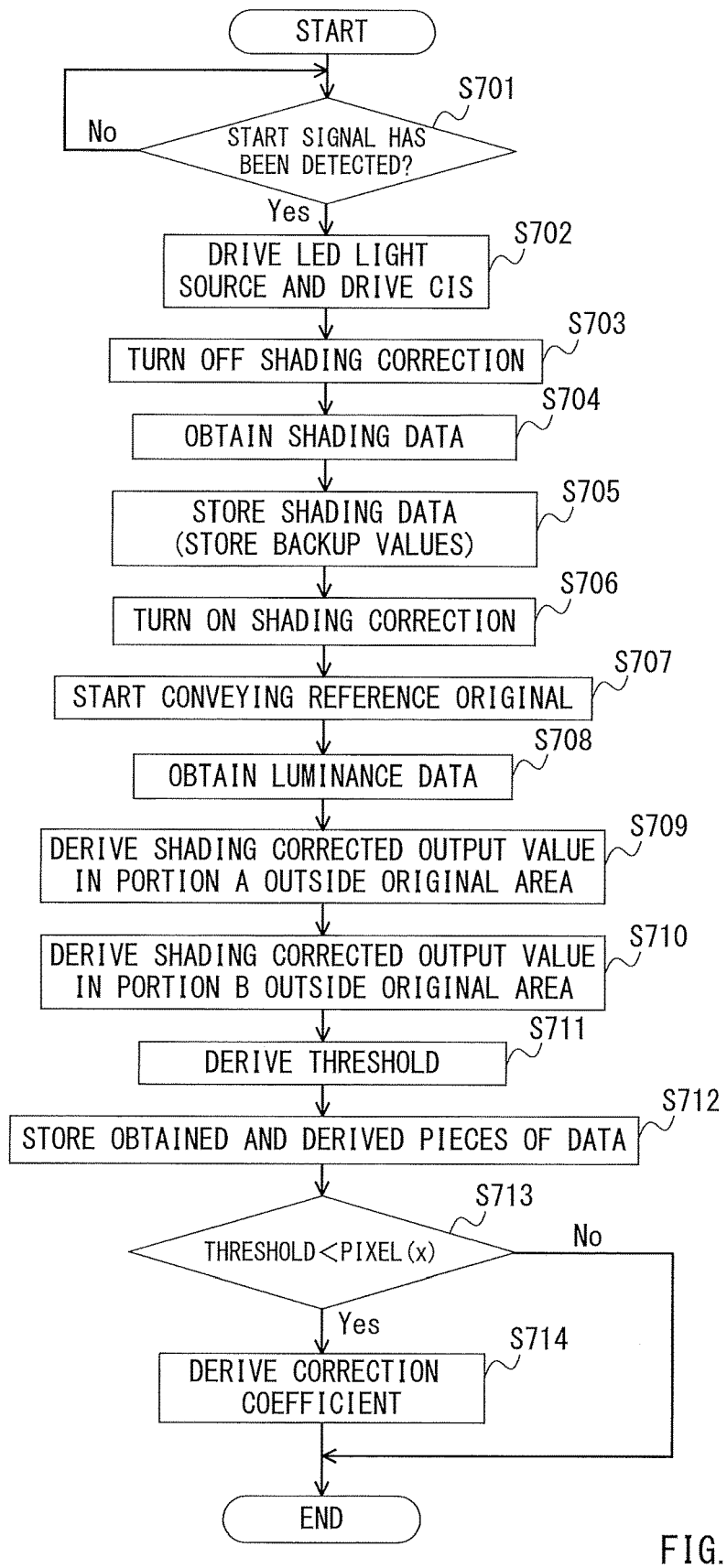
FIG. 11 is a flow chart for illustrating an example of processing steps of obtaining corrected shading data by calculating a correction coefficient of shading data for an area outside an original area.

Next, with reference to a flow chart of FIG. 11, as an example of the processing in Step S820 (corrected shading data obtaining processing), description is made of processing of calculating a correction coefficient for shading data in the portions A and B outside the original area.

FIG. 11 is a flow chart for illustrating an example of processing steps of obtaining corrected shading data by calculating a correction coefficient of shading data for an area outside an original area. Processing procedures illustrated in FIG. 11 are executed mainly by the CPU 401.

The CPU 401 determines whether or not a start signal for corrected shading data obtaining processing has been detected (Step S701).

When a start signal for corrected shading data obtaining processing is detected (Step S701: "Yes"), the CPU 401 starts driving the LED light source 201 and the CIS 203 (Step S702).

The CPU 401 turns off shading correction (Step S703) and, in this state, reads the white reference board 125 via the original reading unit 106 to obtain shading data (Step S704). The CPU 401 stores the obtained shading data in the backup memory 402 (Step S705).

The CPU 401 turns on shading correction (Step S706). The CPU 401 drives the original conveying motor 105 to start conveying a reference original (original 102 having a uniform density, for example, blank original) that is placed on the original tray 101 (Step S707).

The CPU 401 obtains, via the original reading unit 106, luminance data from the result of reading the reference original placed on the guide member when the reference original passes through the original reading point 107 (Step S708).

The CPU 401 derives from the obtained luminance data a shading corrected output value in the portion A (left edge portion) of the row of main scanning pixels outside the original area (Step S709). The CPU 401 also derives a shading corrected output value in the portion B (right edge portion) of the row of main scanning pixels outside the original area (Step S710). The CPU 401 derives a threshold from the obtained luminance data (Step S711).

The CPU 401 stores the obtained luminance data, the shading corrected output value of the portion A outside the original area, and the shading corrected output value of the portion B outside the original area in the computation-use temporary SRAM 405 (Step S712).

The CPU 401 reads luminance values stored in the computation-use temporary SRAM 405 for comparison to a threshold, and determines whether or not there is a pixel whose luminance value exceeds the threshold (correction target pixel) (Step S713).

When there is a pixel that exceeds the threshold (Step S713: "Yes"), the CPU 401 calculates a correction coefficient that is used to correct shading data for the correction target pixel. For a pixel that does not exceed the threshold, 1 is set as a correction coefficient (Step S714). The calculated correction coefficient and the set correction coefficient are stored in the correction coefficient SRAM 406.

Through the series of processing steps described above, the luminance value can be made even also when shading data is corrected using an original that has a uniform density (for example, blank original) and that has a narrow width relative to the width of the main scanning area (effective sensor pixels) of the original reading unit 106.

Figure 12:
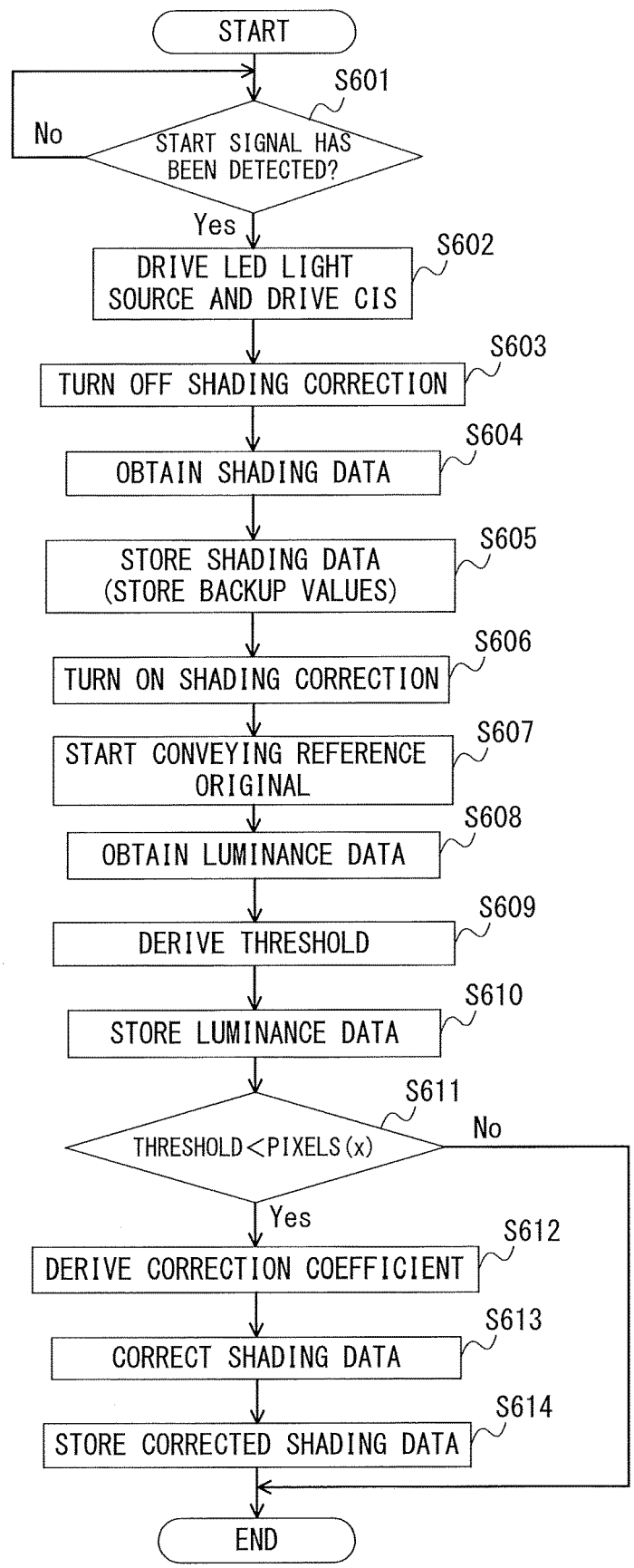
FIG. 12 is a flow chart for illustrating an example of processing steps of obtaining corrected shading data by calculating a correction coefficient for shading data.

Next, with reference to a flow chart of FIG. 12, description is made of processing of calculating a correction coefficient for correcting shading data using an original that has a uniform density (for example, blank paper) and that is wide relative to the width of the main scanning area (effective sensor pixels) of the original reading unit 106.

FIG. 12 is a flow chart for illustrating an example of processing steps of obtaining corrected shading data by calculating a correction coefficient for shading data. Processing procedures illustrated in FIG. 12 are executed mainly by the CPU 401.

The CPU 401 determines whether or not a start signal for corrected shading data obtaining processing has been detected (Step S601). When the start signal for corrected shading data obtaining processing is detected (Step S601: "Yes"), the CPU 401 starts driving the LED light source 201 and the CIS 203 (Step S602).

The CPU 401 turns off shading correction (Step S603) and, in this state, reads the white reference board 125 via the original reading unit 106 to obtain shading data (Step S604). The CPU 401 stores the obtained shading data in the backup memory 402 (Step S605).

The CPU 401 turns on shading correction (Step S606). The CPU 401 drives the original conveying motor 105 to start conveying the reference original (original 102 having a uniform density, for example, blank original) that is placed on the original tray 101 (Step S607). The CPU 401 obtains luminance data from the result of reading the reference original via the original reading unit 106 (Step S608).

The CPU 401 derives a threshold from the obtained luminance data (Step S609). The CPU 401 stores the obtained luminance data in the computation-use temporary SRAM 405 (Step S610).

The CPU 401 reads luminance values stored in the computation-use temporary SRAM 405 for comparison to a threshold, and determines whether or not there is a pixel whose luminance value exceeds the threshold (correction target pixel) (Step S611).

When there is a pixel that exceeds the threshold (Step S611: "Yes"), the CPU 401 calculates a correction coefficient that is used to correct shading data for the correction target pixel (Step S612). The calculated correction coefficient is stored in the correction coefficient SRAM 406.

The CPU 401 corrects shading data for the correction target pixel based on the calculated correction coefficient (Step S613). The CPU 401 corrects the shading data by reading the shading data out of the backup memory 402, and applying a correction coefficient that is stored in the correction coefficient SRAM 406 to the read shading data.

The CPU 401 stores the shading data that has been corrected (corrected shading data) in the backup memory 402 again (Step S614).

The reading apparatus 120 is thus capable of making the luminance value in the main scanning central portion, the luminance value at the main scanning left and right edge portions, and the luminance value outside the original area even with one another at a reading point by correcting shading data for the main scanning left and right edge portions, even when the reading point and the shading point are two different points. Luminance unevenness in the reading range is prevented as a result.

Modification Example

The correction coefficient calculation described above may be performed when the reading apparatus 120 is shipped out of the factory. The reading apparatus 120 may be configured so that correction coefficient calculating processing can be executed at any time independent of shading correction, under a user's instruction, by adding a mode for calculating a correction coefficient.

Figure 13:
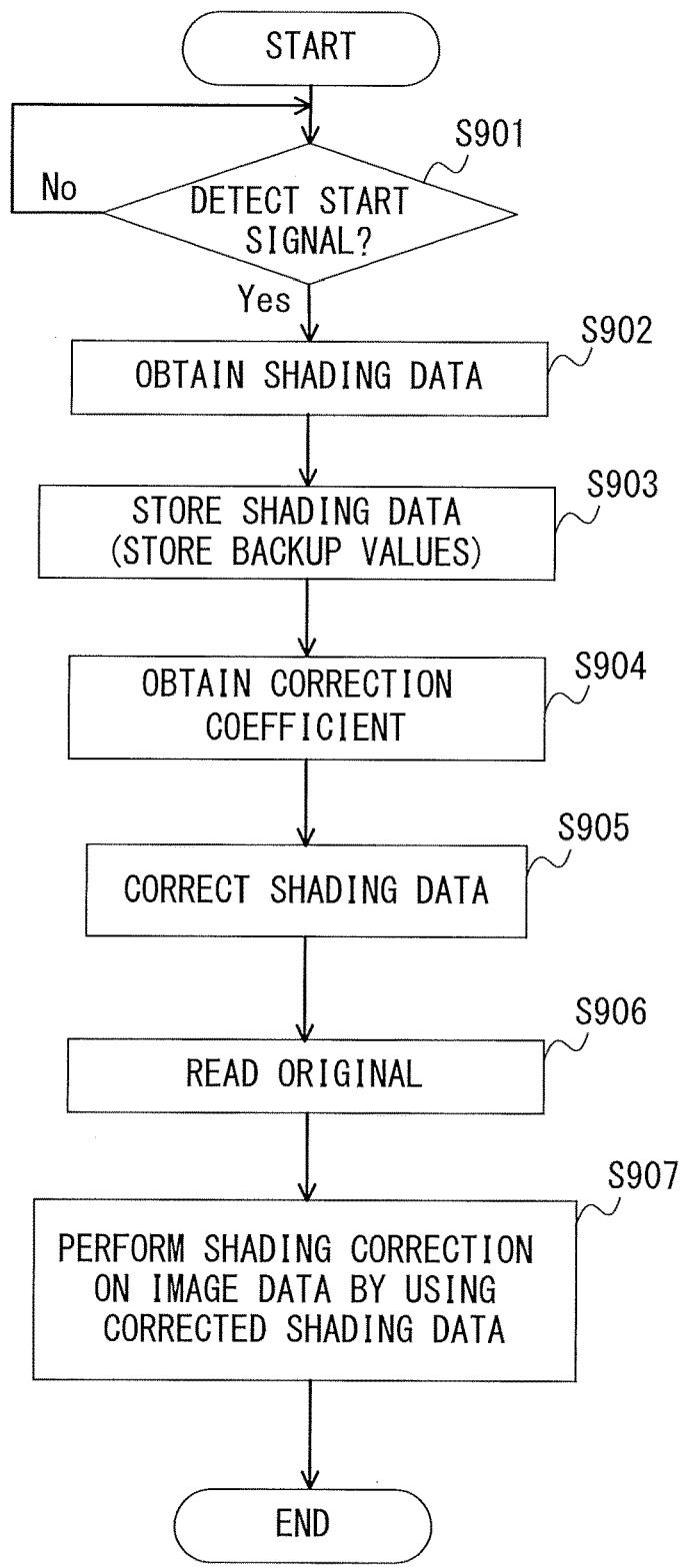
FIG. 13 is a flow chart for illustrating an example of processing steps of shading correction that is executed by the reading apparatus using a correction coefficient calculated in advance.

FIG. 13 is a flow chart for illustrating an example of processing steps of shading correction processing that is executed by the reading apparatus 120 using a correction coefficient calculated in advance.

The premise here is that a correction coefficient calculated in advance by the processing of Steps S702 to S714, which are illustrated in FIG. 11, the processing of Steps S602 to S612, which are illustrated in FIG. 12, or other types of processing is stored in the correction coefficient SRAM 406. Processing procedures illustrated in FIG. 13 are executed mainly by the CPU 401.

The CPU 401 determines whether or not a start signal for shading correction processing has been detected (Step S901). When a start signal for shading correction processing is detected (Step S901: "Yes"), the CPU 401 drives the LED light source 201 and the CIS 203 to read the white reference board 125 via the original reading unit 106 and obtain shading data (Step S902).

The CPU 401 stores the obtained shading data in the backup memory 402 (Step S903).

The CPU 401 reads and obtains a correction coefficient that is calculated in advance and stored in the correction coefficient SRAM 406 (Step S904).

The CPU 401 corrects shading data for the correction target pixel based on the obtained correction coefficient (Step S905). The CPU 401 stores the shading data that has been corrected (corrected shading data) in the backup memory 402.

The CPU 401 reads an original (Step S906). The CPU 401 performs shading correction on the result of reading the original (image data), using the corrected shading data (Step S907).

The CPU 401 executes shading correction using corrected shading data by reading the corrected shading data out of the backup memory 402 and setting the read data to the shading correction circuit 404.

The present invention can also be implemented by processing of providing a program for implementing one or more functions of the embodiment described above to a system or an apparatus via a network or a storage medium, and one or more processors in a computer of the system or the apparatus reading and executing the program. Those functions can also be implemented by a micro-processing unit (MPU), an application specific integrated circuit (ASIC), a system-on-a-chip (SoC), or the like.

According to the present invention, luminance unevenness in the reading range can thus be prevented by correcting shading data based on a luminance that is the result of reading executed after the shading correction.

The above-mentioned embodiment is given just for the purpose of describing the present invention more specifically, and the scope of the present invention is not limited by the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Further, embodiment (s) of the present invention can also be realized by a computer of a system or apparatus that includes one or more circuits (e.g., application specific integrated circuit (ASIC) or SOC (system on a chip)) for performing the functions of one or more of the above-described embodiment(s). The computer may comprise one or more processors (e.g., central processing unit (CPU), micro processing unit (MPU)) and may include a network of separate computers or separate processors to read out and execute the computer executable instructions.

This application claims the benefit of Japanese Patent Application No. 2016-181273, filed Sep. 16, 2016 which is hereby incorporated by reference herein in its entirety.

What is claimed is:

1. A reading apparatus, comprising:
a conveyor configured to convey an original;
a guide member, having a one side and the opposite other side, configured to guide the original conveyed by the conveyor in a conveyance direction at the opposite other side;
a reading unit configured to read the original conveyed by the conveyor;
a white reference member provided at the one side;
a shading corrector configured to perform shading correction on a result of reading the original by the reading unit, based on shading data and a correction coefficient; and
a processor configured to obtain the shading data, based on a result of reading the white reference member by the reading unit, and configured to calculate the correction coefficient from a result of reading a reference original, which is placed on the guide member,
wherein the processor is configured to calculate the correction coefficient outside an area of the reference original in a main scanning direction, which is orthogonal to the conveyance direction, based on a result of reading the reference original inside the area of the reference original in the main scanning direction.

2. The reading apparatus according to claim 1,
wherein the reading unit is configured to read the reference original within a reading range in the main scanning direction, and
wherein the processor is configured to calculate the correction coefficient based on a difference between a luminance value in a central portion of the reading range and a luminance value at left and right edge portions of the reading range.

3. The reading apparatus according to claim 2,
wherein the reading unit comprises a row of light receiving elements aligned in a direction orthogonal to the direction in which the original is conveyed, and
wherein the processor is configured to set a threshold based on the luminance value of the central portion, identify a pixel having the luminance value that exceeds the threshold, and calculate the correction coefficient for the identified pixel.

4. The reading apparatus according to claim 2, wherein the processor is configured to calculate the correction coefficient so that the luminance value in the central portion and the luminance value at the left and right edge portions have the same value.

5. The reading apparatus according to claim 1, wherein the processor is configured to calculate, in a case where a length of the reference original in the main scanning direction is smaller than a length of the light receiving element row in the main scanning direction, the correction coefficient based on a luminance value that is obtained from a result of reading the original inside an original area by the reading unit and a luminance value that is obtained from a result of reading areas other than the original outside the original area by the reading unit.

6. The reading apparatus according to claim 5, wherein the processor is configured to derive luminance values of pixels outside the original area based on a rate of change of the luminance value inside the original area, and to calculate the correction coefficient based on each of the derived luminance values.

7. The reading apparatus according to claim 5,
wherein the reading unit is configured to read an original that has a uniform density within the reading range, and
wherein the processor is configured to set a threshold based on the luminance value of the central portion in the reading range, identify a pixel having the luminance value that exceeds the threshold, and calculate the correction coefficient for the identified pixel.

8. The reading apparatus according to claim 1, wherein the shading corrector is configured to perform shading correction on image data that is read by the reading unit, based on shading data that has been corrected by using the correction coefficient.

9. An image forming apparatus, comprising an image forming unit configured to form an image on a given recording medium based on read data read by a reading apparatus, wherein the reading apparatus comprising:
a conveyor configured to convey an original;
a guide member, having a one side and the opposite other side, configured to guide the original conveyed by the conveyor in a conveyance direction at the opposite other side;
a reading unit configured to read the original conveyed by the conveyor;
a white reference member provided at the one side;
a shading corrector configured to perform shading correction on a result of reading the original by the reading unit, based on shading data and a correction coefficient; and
a processor configured to calculate the correction coefficient from a result of reading a reference original, which is placed on the guide member,
wherein the processor is configured to calculate the correction coefficient outside an area of the reference original in a main scanning direction, which is orthogonal to the conveyance direction, based on a result of reading the reference original inside the area of the reference original in the main scanning direction.

* * * * *